Patented Apr. 17, 1934

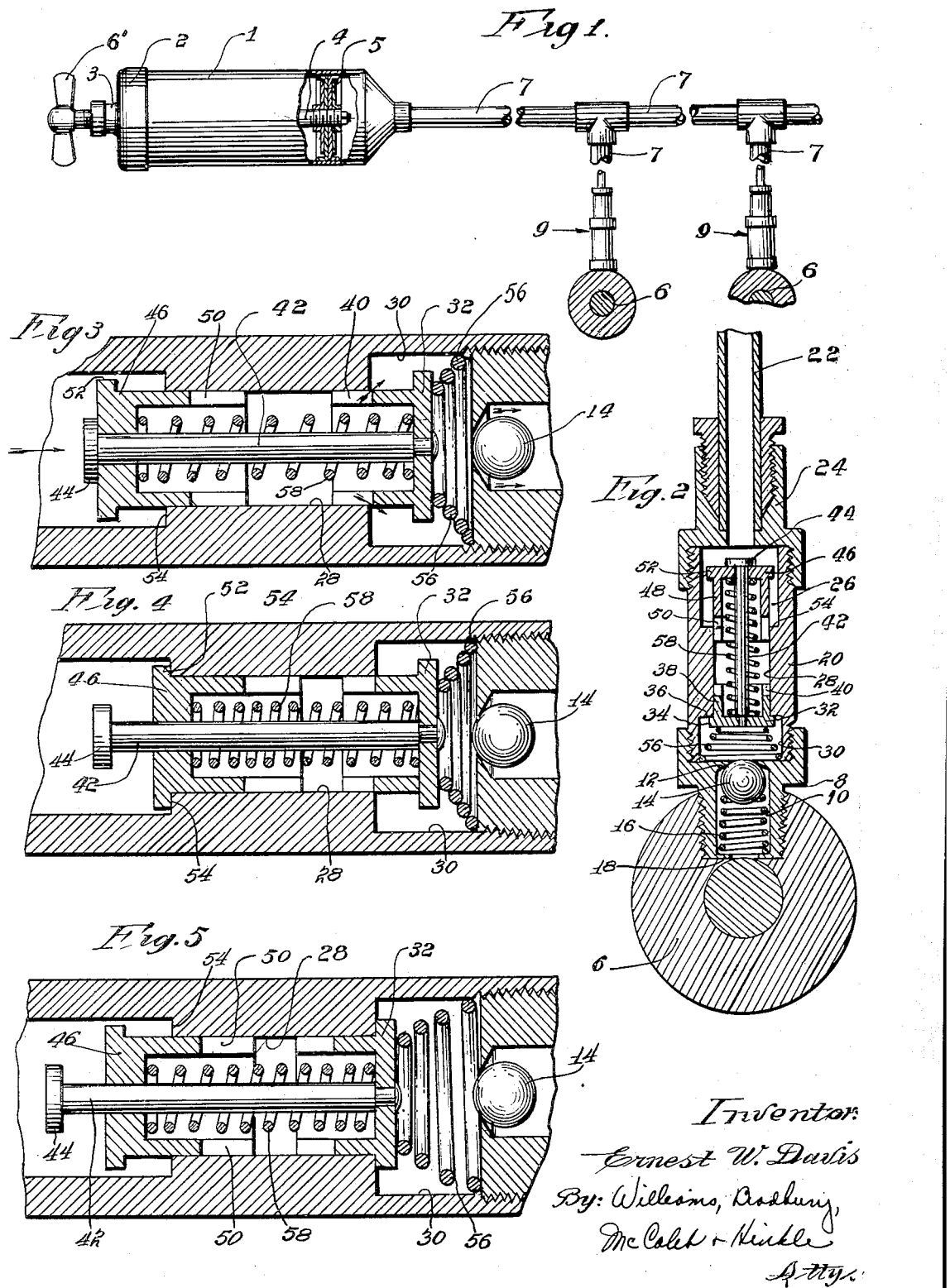

1,955,412

UNITED STATES PATENT OFFICE 1,955,412

LUBRICATING APPARATUS

Ernest W. Davis, Oak Park, Ill., assignor to Alemite Corporation, a corporation of Delaware Application July 15, 1927, Serial No. 205,982

25 Claims. (Cl. 184—7)

My invention relates to lubricating systems and apparatus in general and more particularly to central systems in which a plurality of bearings are lubricated from a common source of lubricant under pressure.

It is an object of my invention to provide an automatically operable measuring valve adapted to be positioned at each of the bearings of a central system and to deliver to the bearings a measured charge of lubricant upon each pressure impulse from the source.

It is a further object of my invention to provide a measuring valve in which the lubricant at no time has a free passageway from the source to the bearing.

It is a further object of my invention to provide a measuring valve of simple construction, which is reliable in operation and which may be economically manufactured.

Other objects will appear from the following description, reference being had to the accompanying drawing in which:

Figure 1 is a diagrammatic view of a system in which the measuring valve of my invention may be used;

Figure 2 is a central vertical cross sectional view of my improved valve as used in the system, the parts being shown in normal position;

Figures 3, 4 and 5 are views similar to Figure 2, showing the parts in various positions taken during their operating cycle, viz, just after the beginning of the discharge stroke, at the end of the discharge stroke, and near the end of the return stroke respectively.

The measuring valve of my invention is adapted to be used in a central system, as above described, or in a similar lubricating system in which a pump or other suitable pressure developing means is connected by conduits with each of a plurality of bearings to be lubricated. As is well known in the art, the pump is manually or periodically operated to increase the pressure in the conduits and thereby actuate the measuring valves, causing them to eject lubricant to the bearings. The lubricant pressure in the conduits is then relieved by any suitable means to permit a slight back-flow of the lubricant in the conduits. If desired the compressor may be detachably connected to the conduit system by any suitable well-known high pressure coupling device.

Referring to Figure 1, I have diagrammatically illustrated a system employing a grease gun or compressor of a well-known type for placing the lubricant under pressure, which comprises a tubular barrel 1 having one end closed by a removable cap 2 which carries an internally threaded boss 3. A stem 4, carrying a piston 5, is threaded through the boss and carries a handle 6'. Conduits 7 connect the compressor with the bearings 6 to be lubricated, measuring valves designated generally as 9 being connected between the conduits and the bearings.

Referring to Figure 2, I have conventionally shown bearing 6 which is illustrative of one of a plurality of bearings of an automobile or a machine. A check valve cage 8 is secured in a threaded hole in the bearing. This cage is provided with a central bore 10, partially closed at its upper end to form a seat 12 for the ball closure 14 which is normally pressed against the seat by a light spring 16, the lower end of which seats upon a suitable flange 18 projecting into the lower end of the bore 10. The upper end of the cage 8 is internally threaded to receive the measuring valve body 20, the upper end of which is connected to a conduit 22 by any suitable well known coupling means, including a cap 24. The body portion 20 has an axial bore of different diameters to provide an upper chamber 26, a cylindrical measuring chamber 28 and a lower chamber 30. A piston valve 32 is normally seated to close the lower end of the cylindrical portion 28, its flange 34 abutting against a shoulder 36 of the valve body. A skirt portion 38 of the piston valve 32 has a lubricant tight sliding fit with the wall of the cylinder 28 and its upper end has a plurality of notches 40 to provide ports, as will appear hereinafter.

The lower end of a stem 42 is rigidly secured to the piston valve 32 and at its upper end has a head 44. Slidably mounted upon the stem 42 is a second piston valve 46 which is similar to the valve 32, except that its skirt portion 48 is longer. The skirt portion 48 has suitable notches or open-end slots 50 at its lower end and has a flange 52 which is adapted to abut against a shoulder 54 on the body to limit downward movement of the valve, upward movement being limited by the head 44. A spring 56 resting upon the cage 8 engages the bottom of the valve 32 and normally holds it against its seat 36. A somewhat lighter spring 58 is confined between the valve 32 and 46 and normally holds them separated in the position as shown in Figure 2.

The operation of my improved measuring valve is as follows:

Referring to Figure 2 it will be assumed that the measuring valve is filled with oil. Upon application of lubricant pressure from the source through the conduit 22, the piston valve 46, stem 42, spring 58 and piston valve 32 will move as a unit until the parts come into position approximately as illustrated in Figure 3, when the lubricant will begin to discharge through the ports 40 formed in the skirt portion of the valve 32, into the chamber 30 and past the ball check valve 14 to the bearing. Discharge of the lubricant will continue, the piston valve 46 sliding on the stem 42 to the position shown in Figure 4 where its further movement is arrested by the abutment of its flange 52 with the shoulder 54. It will be remembered that spring 56 is stronger than spring 58 so that the valve 46 may readily move with respect to the valve 32, while the latter remains in a position where its ports 40 are moved past the shoulder or seat 36 only a sufficient distance to permit the discharge of lubricant. Upon relief of the lubricant pressure in the supply line the springs 56 and 58 will expand to return the valves 32 and 46 respectively to their normal positions. Since the spring 56 is stronger than the spring 58 the valve 32 will be the first to be returned to normal position as indicated in Figure 5. Since the space between the two valves is completely filled with lubricant during the time that the valve 32 is returning to its seat, the valve 46 will travel the same distance as the valve 32. After the valve 32 abuts against the shoulder 36, spring 58 will force the piston valve 46 to normal position, creating a partial vacuum within the cylinder 28 which, of course will be replaced by lubricant as soon as the notched ports 50 pass the shoulder seat 54.

It will be noted that during no time throughout the operation of the valve is there a free passage for lubricant from the conduit 22 to the bearing, thus making it possible exactly to measure the charge to the bearing. In utilizing the valve of my invention in a system in which some bearings require more or less lubricant than others, the measuring valves may be made of different sizes so that each bearing may receive a charge proportioned to its needs. Either the diameter of the cylinder 28 may be increased if a larger charge is desired, or the lengths of the skirt portions of the valves may be increased. It will be noted that the volume of the charge depends upon the differences in the lengths of the skirt portions of the two piston valves and the cross sectional area of the cylinder.

A system of lubrication, employing the above described measuring valve, has material advantages. The charge to each bearing is constant irrespective of the pressure developed by the pump or compressor as long as the pressure is great enough fully to operate the valves. This is especially advantageous when grease or a heavy oil is used in cold weather, when there is a great pressure drop in the conduits due to friction and viscosity. The pump or compressor may be designed to force the lubricant to the most remote bearing under ample pressure effectively to operate the measuring valve under such adverse temperature conditions, and yet not change the operation of the measuring valve nearest the pump under temperature conditions most favorable to the free flow of the lubricant.

The total volume of lubricant delivered to the bearings is the same for each operation of the compressor, so that a leak in the system or a failure of some of the measuring valves to operate may be detected by noting whether or not the system "takes" more or less than its usual quantity of lubricant.

The system (within the limits of the pressures used) is not affected by variations or differences in the resistance to lubricant flow of the several bearings. Each bearing will receive its proper charge no matter how great its resistance may be as long as the pressure applied is high enough to overcome this resistance.

While I have shown and described but a single embodiment of my invention, it will be apparent to those skilled in the art that variations in the structure and utilization thereof may be made without departure from the principles of my invention. I therefore wish to limit the scope of my invention only by the claims which follow.

I claim:

1. In a device of the class described, a body having a cylindrical measuring chamber, an inlet piston valve having its skirt portion slidable within one end of said chamber, an outlet valve having a skirt portion slidable within the other end of said chamber, the skirt portions having ports near their inner ends, and spring means tending to hold said inlet valve open and said outlet valve closed.

2. A measuring valve comprising a body having a cylindrical chamber with its central portion of reduced diameter, a pair of piston valves slidable into and adapted to close the ends of said reduced portion, springs normally holding one of said valves closed and the other open, and a lost motion connection between said valves whereby, upon a fluid pressure impulse applied to said valve, the normally open valve will close before the normally closed valve opens thereby to segregate a measured charge of lubricant in said portion of said cylinder.

3. In a device of the class described, a body having a cylindrical measuring chamber, an inlet piston valve having its skirt portion slidable within one end of said chamber, an outlet valve having a skirt portion slidable within the other end of said chamber, the skirt portions having ports near their inner ends, spring means tending to hold said inlet valve open and said outlet valve closed, and a lost motion connection between said valves to permit said inlet valve to close prior to the opening of said outlet valve.

4. In a lubricating system a source of lubricant, conduits leading from said source to the bearings to be lubricated, and a lubricant measuring device connected between said conduits and each bearing and automatically operable upon an increase in pressure in the conduit to supply a measured charge of lubricant to the bearing, said device comprising relatively movable inlet and outlet valves and a connection between said valves to prevent said outlet valve from opening while said inlet valve is open.

5. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a measuring chamber and a pair of valves adapted to close the ends of said chamber, and a lost motion connection between said valves, said connection comprising means independent of said chamber for positively limiting the extent of separation of said valves.

6. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a cylindrical measuring chamber, a pair of piston shaped valves guided by the walls of said chamber, and a member having a lost motion connection joining said valves.

7. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a measuring chamber, valves adapted to close the ends of said chamber, a lost motion connection between said valves adapted to permit said valves to move relative to one another and to maintain one or the other of said valves in closed position at all times, and a check valve for preventing return flow of lubricant from said bearing to said chamber.

8. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a cylindrical measuring chamber, a valve at each end of said chamber, a lost motion connection between said valves, and means operative upon an increase in pressure in said conduits automatically to close one of said valves and subsequently open the other and upon a decrease in pressure in said conduit to close said last named valve and open said first named valve.

9. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a measuring chamber having inlet and outlet ports, an inlet valve and an outlet valve closing said ports respectively, a lost motion connection between said valves, and means operative upon a pressure impulse in said conduit successively to close said inlet valve and open said outlet valve, and upon a reduction of pressure close said outlet valve and open said inlet valve.

10. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a measuring chamber having inlet and outlet ports, valves adapted to close said ports, and means including a lost motion connection between said valves to prevent said valves from being open at the same time.

11. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a measuring chamber having inlet and outlet ports, valves adapted to close said ports, a lost motion connection between said valves, means tending normally to hold said valves separated, and resilient means tending to close the valve over the outlet port of said chamber.

12. A lubrication system for machine bearings comprising such bearings and conduits leading thereto, a reservoir, means for forcing lubricant from said reservoir into said conduits under pressure, a measuring device for each of said bearings and supplied with lubricant from said conduit, said device comprising a cylindrical measuring chamber having inlet and outlet ports, piston valves adapted to close said ports, the skirt portions of said valves being guided by the walls of said chamber, a stem fixed to one of said valves and joined by a lost motion connection with the other of said valves, a spring between said valves normally holding them separated, and a second stronger spring normally holding the valve at the outlet port of said chamber closed.

13. A charge measuring device for use in lubricating systems, comprising a cylindrical measuring chamber, a pair of piston shaped valves guided by the walls of said chamber and movable into and partially out of said chamber, a member having a lost motion connection joining said valves, and a spring normally holding said valves apart.

14. A charge measuring device for use in a lubricating system comprising a cylindrical measuring chamber having inlet and outlet ports, piston valves adapted to close said ports, the skirt portions of said valves being guided by the walls of said chamber, a stem fixed to one of said valves and joined by a lost motion connection with the other of said valves, a spring between said valves normally holding them separated and a second stronger spring normally tending to close the valve at the outlet port of said chamber.

15. A charge measuring device for use in a lubricating system comprising a measuring chamber having inlet and outlet ports, valves adapted to close said ports, a lost motion connection between said valves, means engaging said valves and tending normally to hold said valves separated, and resilient means tending to close the valve over the outlet port of said chamber.

16. In a lubricating system, a source of lubricant, conduits leading from said source to the bearings to be lubricated, and a lubricant measuring device connected between said conduits and each bearing and automatically operable upon a lubricant pressure impulse in the conduit to supply a measured charge of lubricant to the bearing at substantially the pressure of said impulse, said device comprising a measuring chamber having inlet and outlet ports, valves closing said ports, and a connection between said valves to prevent said outlet valve from opening while said inlet valve is open.

17. A lubricating system for machine bearings comprising such bearings and conduits leading thereto, a reservoir, means for forcing lubricant from said reservoir into said conduits under pressure, a measuring device for each of said bearings and supplied with lubricant from said conduit, said device including a pair of relatively movable piston valves operable upon actuation of said lubricant forcing means to segregate a predetermined charge of lubricant between them and thereafter force it into the bearing, said means being operable throughout a wide range of lubricant pressures and bearing resistances, and a check valve for preventing return flow of lubricant from the bearing.

18. A measuring device including a cylinder having a bore provided with enlarged portions, pistons movably mounted in the bore, and means connecting the pistons and permitting one of the pistons to move relatively to the other, the space between the pistons constituting a measuring chamber, and the pistons being operable under fluid pressure to charge and discharge the measuring chamber.

19. In a device of the character described, a cylinder having a bore, caps closing the ends of the bore, relatively movable connected pistons arranged in the bore, the bore being shaped to permit fluid in the bore to flow past one of the pistons and to be obstructed by the other piston, the space between the pistons constituting a measuring chamber, and the pistons being operable under fluid pressure to charge and discharge the measuring chamber.

20. In a device of the character described, a cylinder having a bore, apertured caps closing the ends of the bore, and relatively movable connected pistons arranged in the bore, the bore being shaped to permit fluid to flow in the bore past one of the pistons, while the other piston completely closes the bore, the space between the pistons constituting a measuring chamber, and the pistons being operable under fluid pressure to charge and discharge the measuring chamber.

21. In a device of the character described, a cylinder having a bore, apertured caps closing the ends of the bore, and relatively movable connected pistons arranged in the bore, the bore being shaped to permit fluid to flow in the bore past one of the pistons, while the other piston completely closes the bore, and means for preventing the pistons from snugly seating against either one of said caps, the space between the pistons constituting a measuring chamber, and the pistons being operable under fluid pressure to charge and discharge the measuring chamber.

22. In a device of the character described, a cylinder having a bore, apertured caps closing the ends of the bore, relatively movable connected pistons arranged within the bore, and each being of the same diameter as the main portion of the bore, the bore having enlargements at its end portions to allow fluid to flow around the pistons when they occupy such portions, the space between the pistons constituting a measuring chamber, and the pistons being operable under fluid pressure to charge and discharge the measuring chamber.

23. In a device of the character described, a cylinder having a bore, apertured caps closing the ends of the bore, relatively movable connected pistons arranged within the bore, and each being of the same diameter as the main portion of the bore, the bore having enlargements at its end portions to allow fluid to flow around the pistons when they occupy such portions, and means for normally urging the pistons toward one of said caps, the space between the pistons constituting a measuring chamber, and the pistons being operable under fluid pressure to charge and discharge the measuring chamber.

24. In a device of the character described, a cylinder having a bore, apertured caps closing the ends of the bore, relatively movable connected pistons arranged within the bore, and each being of the same diameter as the main portion of the bore, the bore having enlargements at its end portions to allow fluid to flow around the pistons when they occupy such portions, and a spring in the bore for forcing both pistons toward one of said caps, the space between the pistons constituting a measuring chamber, and the pistons being operable under fluid pressure to charge and discharge the measuring chamber.

25. In a device of the character described, a cylinder having a bore, apertured caps closing the ends of the bore, relatively movable connected pistons arranged within the bore, and each being of the same diameter as the main portion of the bore, the bore having enlargements at its end portions to allow fluid to flow around the pistons when they occupy such portions, and a spring arranged between the pistons and acting to force one piston away from the other, the space between the pistons constituting a measuring chamber, and the pistons being operable under fluid pressure to charge and discharge the measuring chamber.

ERNEST W. DAVIS.